United States Patent [19]

Archer et al.

[11] Patent Number: 4,841,306

[45] Date of Patent: Jun. 20, 1989

[54] MULTI-COLOR FLUID JET PATTERN GENERATOR FOR TEXTILES

[75] Inventors: Timothy H. V. Archer; Richard Sutera, both of Centerville, Ohio

[73] Assignee: Burlington Industries, Inc., Greensboro, N.C.

[21] Appl. No.: 97,677

[22] Filed: Sep. 17, 1987

[51] Int. Cl.[4] ................................ G01D 15/18

[52] U.S. Cl. ................................ 346/1.1; 346/75; 346/140 R

[58] Field of Search ................ 346/1.1, 75, 140 R; 400/56

[56] References Cited

U.S. PATENT DOCUMENTS

| | | | |
|---|---|---|---|
| 4,080,607 | 3/1978 | Van Breemen et al. | 346/75 |
| 4,174,908 | 11/1979 | Wehler | 400/56 |
| 4,573,057 | 2/1986 | Sutera et al. | 346/1.1 |
| 4,575,729 | 3/1986 | Ayers et al. | 346/75 |
| 4,594,598 | 6/1986 | Iwagami | 346/140 R |

*Primary Examiner*—E. A. Goldberg
*Assistant Examiner*—Gerald E. Preston
*Attorney, Agent, or Firm*—Nixon & Vanderhye

[57] ABSTRACT

A fluid jet printing line has a plurality of fluid jet printing devices arranged serially to sequentially print on a substrate. Each printing device includes a print bar movable relative to a print head and substrate. Each print head including the print bar carried thereby is mounted for movement between positions in the line and a clean or ready room. In the print line, a sensor detects any increased thickness of the substrate and a pneumatic-mechanical system responds to the sensor to raise the print bar above the thickened portion of the substrate as it passes below the orifice plate and to lower the print bar after the thickened portion has passed. Should a print head malfunction, the line is converted to a full-catch mode, the substrate transport is stopped and the malfunctioning print head is removed. A replacement print head is transported to the line from the clean room in a full-catch running mode and, when disposed in the line, all fluid jet print heads are converted from the full-catch mode to the full print mode. Three-point mountings of the print bar relative to the head and the head relative to the base are provided to assure accurate and repeatable location of the devices in the line and to accommodate thermal expansion and contraction.

24 Claims, 12 Drawing Sheets

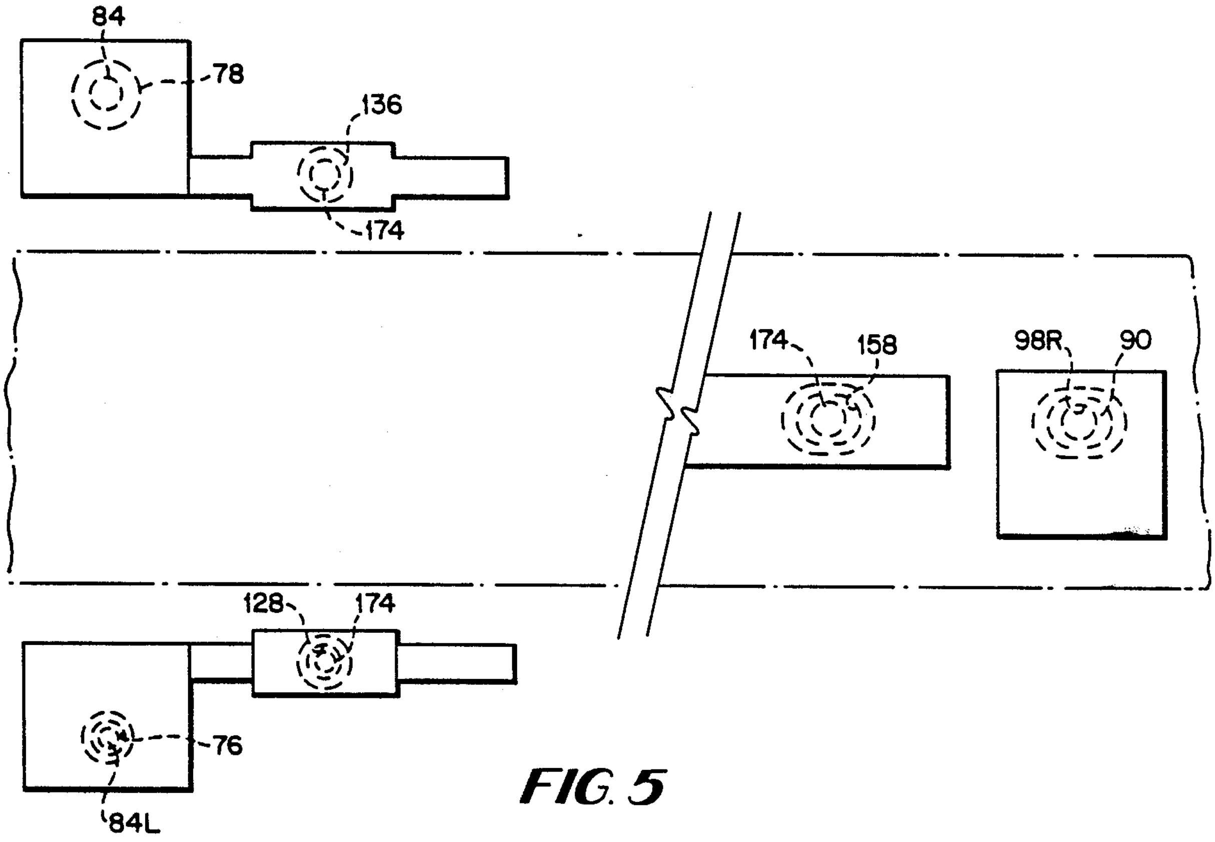
FIG. 5
FIG. 13
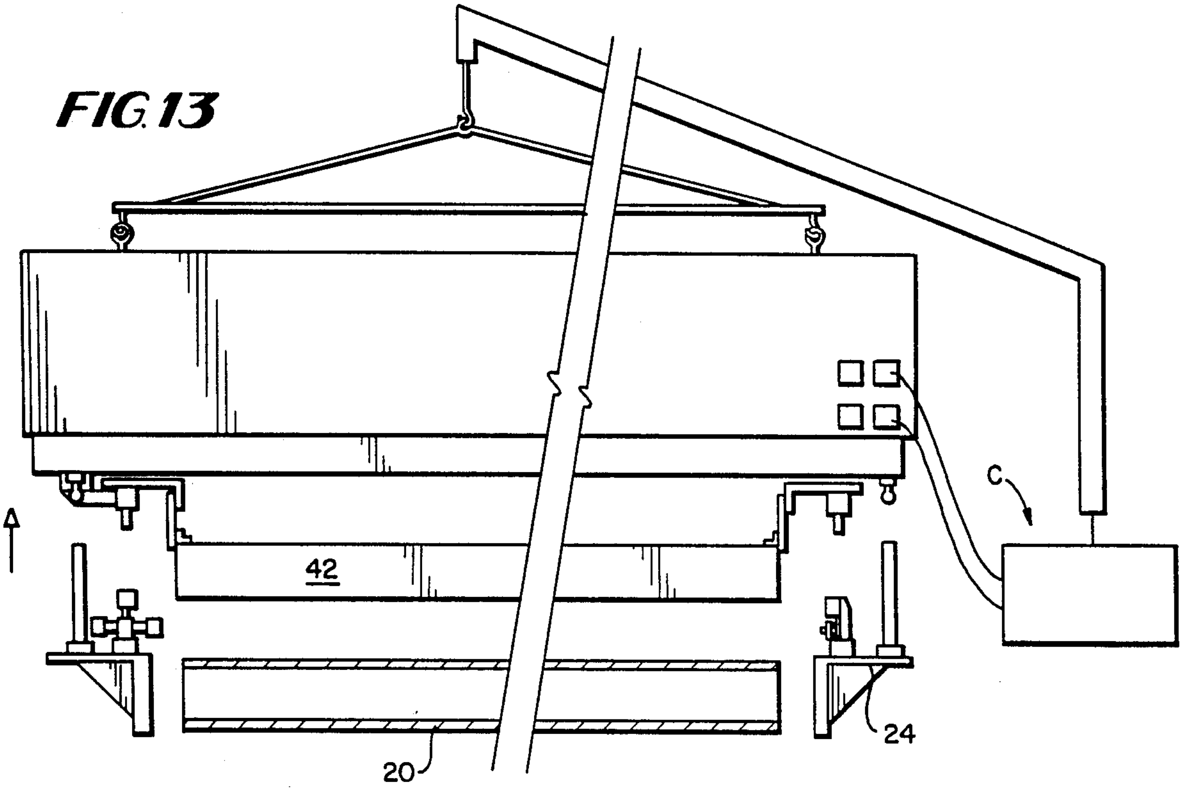

MULTI-COLOR FLUID JET PATTERN GENERATOR FOR TEXTILES

BACKGROUND OF THE INVENTION

The present invention relates to apparatus and methods for fluid jet printing and particularly relates to apparatus and methods for using multiple fluid jet printing heads in a fluid jet printing line wherein each fluid jet printing head may apply a different color, dye, chemical, etc. to a common substrate, preferably a textile fabric, passing serially through each fluid jet printing station.

In a conventional fluid jet printing device, a linear array of fluid jet orifices are formed in a substrate from which filaments of fluid issue to form a plurality of droplet streams for deposition on a substrate. Individually-controllable electrostatic charging electrodes are disposed downstream of the orifice plate along a "drop formation" zone. In accordance with known principles of electrostatic conduction, these fluid filaments are provided an electrical charge opposite in polarity and related in magnitude to the electrical charge of the charging electrode. When the droplets separate from the filaments, the induced electrostatic charge is trapped on and in the droplets. The charged droplets then pass through a subsequent electrostatic field and are thereby deflected from a straight downward path toward a catcher structure. Uncharged droplets proceed along the straight path and are deposited upon the receiving substrate.

When providing a fluid jet printing device in a fabrication line to create multi-color patterns on textile substrates, a number of complications and practical problems arise. For example, when running a textile substrate sequentially through a plurality of fluid jet printing devices, it is highly desirable to locate the individual printing heads as close to one another as possible. Because textile fabrics have a width on the order of 1.8 meters, however, close spacing of the multiple fluid jet printing heads prevents access to the mid-portions of the heads. Thus, servicing one of the fluid jet printing heads intermediate the multiple heads along the fabrication line to correct any problems would be difficult, if not impossible. Also, servicing a particular fluid jet printing head in the line requires shutdown of the other printing heads and the substrate transport as well as moving the print head away from its print position. Moreover, apparatus ancillary to fluid jet printing startup, for example, startup catcher trays and test systems, if placed in the line with the heads, would be inconvenient to access, as well as space-consuming, possibly necessitating greater than the optimum close spacing of the heads one from the other. In short, it would be very difficult to service one or more of the printing heads while the printing heads are operating and highly undesirable to have extensive downtime on the printing line for purposes of servicing just one of the print station heads.

Another problem extant in the processing of textile substrates with pattern-generating fluid jet printing heads arises from the need to locate the catcher assembly of the fluid jet apparatus as close to the substrate as possible. It will be appreciated that the distance between the orifice plate and the substrate is a free-fall region in which the droplets which eventually form the image on the substrate pass uncontrolled. This distance must be maintained as small as possible to preclude introduction of trajectory-altering air currents or the like and to minimize the effect of any angular deviation of the downward path of a droplet. However, long runs of textile fabrics necessarily entail piecing fabric together at seams transverse to the direction of the run. These seams may be too thick to pass between the lower edge of the catcher and the transport belt carrying the fabric, resulting in a collision between the seam and the catcher.

The present invention integrates a solution to both of these problems in the provision of a novel and unique fluid jet printing head assembly for use in a textile fabric fabrication line. The present invention therefore provides a printing head which constitutes a transportable modular sub-system movable between a print station and a make-ready station removed from the print station and at which print station the print head can be started up, debugged and prepared for use and corrected for any improper functioning. The print head can then be moved from the make-ready station while in a running "full-catch" mode into the printing line with the assurance that, when converted in the print line from the "full-catch" mode to the full print mode, the print head will function properly and be accurately located. "Full-catch" mode means herein that all of the fluid droplets are charged by the charge electrodes and deflected by the deflection electrode such that all fluid droplets are caught by the catcher structure for recirculation and that no fluid droplets escape from being caught by the catcher structure.

More particularly, print heads can be selectively removed from and replaced in the printing line with a minimum of down-time in the line. This is accomplished by providing a base for each print head printing station in the line from which the print head may be readily removed and replaced. Each print head is provided with two sets of fluid connections, both of the quick-disconnect type, and two sets of power connections. Additionally, a number of data cable connectors affording the pattern data are provided in parallel to the charge electronics. In the event of a pattern change, for example, the print heads in the line can be converted to a "full-catch" condition and the transport stopped. The print head, which is malfunctioning or scheduled for service or in which a color change is desired, may be removed by lifting the print head from its mounting base and transported to a "clean room" for disposition on a test stand. The removed print head may then be flushed with fluid from a fluid support system. Additionally, diagnostic electronics are provided at the make-ready station which would diagnose any particular problem with such print head. A test substrate transport device is also provided on which the printing may be tested. At the make-ready station, the print head is brought up to its printing state and completely checked out as to print quality and other characteristics. All manipulations to achieve fluid jet straightness and integrity, and all electrode and catcher adjustments are performed at the make-ready station so that the print head arrives in a "ready-to-print" state while in the clean room. When the print head has been checked out and is running satisfactorily in a print mode, the print head is put into a "full-catch" mode, ready for transport back to the print line.

To transport the print head in the "full-catch" mode back to the print line, a movable transport, i.e., a crane carrying a recirculating fluid system and a power supply lifts and transports the print head into the print line while the print head is running in its "full-catch" mode. More particularly, dual sets of fluid and electronic connections are provided on the print head whereby fluid and power connections carried by the crane can be connected to the print head prior to disconnecting the fluid and power connections provided the print head in the ready-station. Additionally, the fluid and power connections used at the print station are disconnected from the print head only after the fluid and power connections carried by the crane are connected to the print head. Thus, the print head is moved from the ready-station to the print station in a full running, "full-catch" state. When in the print line, the print and flush fluids are mixed and diverted to waste before converting the print head from the "full-catch" mode to a full print mode. The entire print line may then be restarted and printing resumed by converting all print heads from the "full-catch" mode to their running mode.

It will thus be appreciated that should a malfunction occur in one or more of the print heads during printing, the line can be stopped and the malfunctioning print head removed from the line. A properly functioning print head can then replace the malfunctioning print head and the line restarted. In this manner, only minimal downtime is required and considerable savings in time are effected inasmuch as the malfunctioning print head can then be completely serviced at the make-ready station and restarted. Such servicing and restarting may take considerable effort and time and consequently the system of the present invention enables continued production of the textile fabric during such servicing. It will be appreciated, however, that a replacement fluid jet printing device may not be readily available to replace a malfunctioning device. Should this occur, the present invention still minimizes downtime by enabling quick service on the malfunctioning device in the clean room and quick and convenient startup once service is completed whereby the serviced device can be returned to the line in running condition.

The mounting between the print head and the base is provided to ensure repeatable high accuracy location of each print head in the line. That is, each replacement print head exactly replicates in location the location of the print head it replaces. This ensures repeatable and precisely located patterns printed on the substrate inasmuch as each print head cooperates with every other print head in the line to achieve certain patterns and configurations in the substrate. Such mounting constitutes a three-point mounting. The three-point mounting additionally accommodates expansion and contraction of the structure due to thermal changes.

Integrated within each print head is a mounting for the distribution bar which carries the orifice plate, charge and deflection electrodes and catcher structure which enables the bar to be raised and lowered relative to the print head and, hence, relative to the substrate transport. This enables a thickened portion, i.e., a seam across the width of the textile fabric, to pass between the transport and the catcher structure without jamming. To accomplish this, a detector, in advance of the print heads, senses the presence of a seam and provides a signal in response thereto. Fluid actuators, e.g., air cylinders, on the individual print heads are responsive to the signal and, in conjunction with a cam and cam follower arrangement, raise the print distribution bar and, hence, the catcher structure, relative to the transport at the time the seam passes below the orifice plate associated with that print head. Preferably, the distance between the orifice plate and the printing substrate surface is maintained substantially constant, while the distance between the catcher structure and the transport is enlarged to accommodate the increased thickness of the textile fabric at the seam. Once the seam has passed a particular print head, the fluid actuator and associated mechanical arrangement lower the distribution bar back to its predetermined elevation to provide the desired minimum distance between the orifice plate and the fabric, while simultaneously enabling the fabric to pass between the transport and the catcher structure.

The mounting between the print bar and the head constitutes a three-point mounting which likewise assures highly accurate and repeatable placement of the distribution bar relative to the head and substrate. Thus, accurate patterns of high resolution may be maintained in the production line notwithstanding the replacement of heads in the line, replacement of distribution bars relative to the heads and the accommodation provided for varying degrees of thickness of the substrate.

Accordingly, in accordance with one aspect of the present invention, there is provided fluid jet printing apparatus for printing on a substrate comprising a fluid jet printing head for disposition above a substrate, a print bar carried by the head including an orifice plate for flowing fluid through the orifices of the plate for deposition on the substrate, and means carried by the head mounting the print bar for movement relative to the head.

In accordance with another aspect of the present invention, there is provided a fluid jet printing apparatus for printing on a substrate, comprising a base, a fluid jet printing head including a distribution bar carrying an orifice plate, electrodes for charging and deflecting charged droplets formed by filaments of fluid flowing from the orifice plate, a catcher structure for catching deflected droplets, and electronic circuitry for charging the electrodes. A transport is provided for carrying the substrate past the orifice plate for receiving uncharged droplets from the orifice plate. Means are also carried by the base for releasably mounting the head for movement between an operative position with the orifice plate in opposition to the substrate carried by the transport and a position removed from the base. Preferably, the head is removed to a make-ready or clean room for servicing.

In a further aspect of the present invention, there is provided a fluid jet printing apparatus for printing on a substrate comprising a base, a fluid jet printing head carried by the base, the printing head carrying a print bar including an orifice plate in opposition to the substrate carried by the base, a fluid distribution bar for flowing fluid through the orifices of the orifice plate, electrodes for charging and deflecting charged droplets formed by filaments of fluid flowing from the orifice plate, a catcher structure for catching deflected droplets and electronic circuitry for charging the electrodes. Means are also provided for raising the print bar relative to the base.

A still further aspect of the present invention provides a fluid jet printing line having a plurality of fluid jet printing devices arranged serially for printing sequentially on a substrate passing along the printing line, a method of disposing a fluid jet printing device in the line comprising the steps of transporting the fluid jet printing device to the line for disposition in the line, operating the fluid jet printing device during transport to the line in a "full-catch" mode, and once disposed in the line, changing the fluid jet printing device from a "full-catch" mode to a full print mode.

An even further aspect of the present invention provides a method of operating a fluid jet printing line having a plurality of fluid jet printing devices arranged serially for printing sequentially on a substrate passing along a printing line comprising the steps of removing one of the fluid jet printing devices from the line, replacing the removed fluid jet printing device in the printing line with a replacement fluid jet printing device and operating the replacement fluid jet printing device in a "full-catch" mode as the latter device is being placed in the fluid jet printing line.

In a still further aspect of the present invention there is provided a method for accommodating an increased thickness portion of ã substrate on a substrate transport as the substrate passes the orifice plate of a fluid jet printing device comprising the steps of sensing the increased thickness portion of the substrate prior to passing the orifice plate and providing a signal in response thereto and increasing the distance between the substrate transport and the orifice plate in response to the signal as the increased thickness portion of the substrate passes below the orifice plate.

Accordingly, it is a primary object of the present invention to provide novel and improved apparatus and methods for generating a pattern on a textile fabric in a textile fabrication line wherein fluid jet printing devices are arranged serially and comprise modular sub-systems which are transportable for removal from the print line and replacement by running fluid jet printing heads whereby minimum downtime in the production line is achieved.

It is another object of the present invention to provide novel and improved methods for fluid jet printing wherein the fluid jet print bar may be momentarily raised relative to the fabric transport to accommodate an increased thickness portion of a fabric, for example, at a seam, as the fabric passes below multiple fluid jet printing heads in a textile fabric production line.

These and further objects and advantages of the present invention will become more apparent upon reference to the following specification, appended claims and drawings.

BRIEF DESCRIPTION OF THE DRAWING FIGURES

FIG. 5 is a plan view schematically illustrating the three-point mountings for the print head on the base and the distribution bar on the head;

Figure 7A:
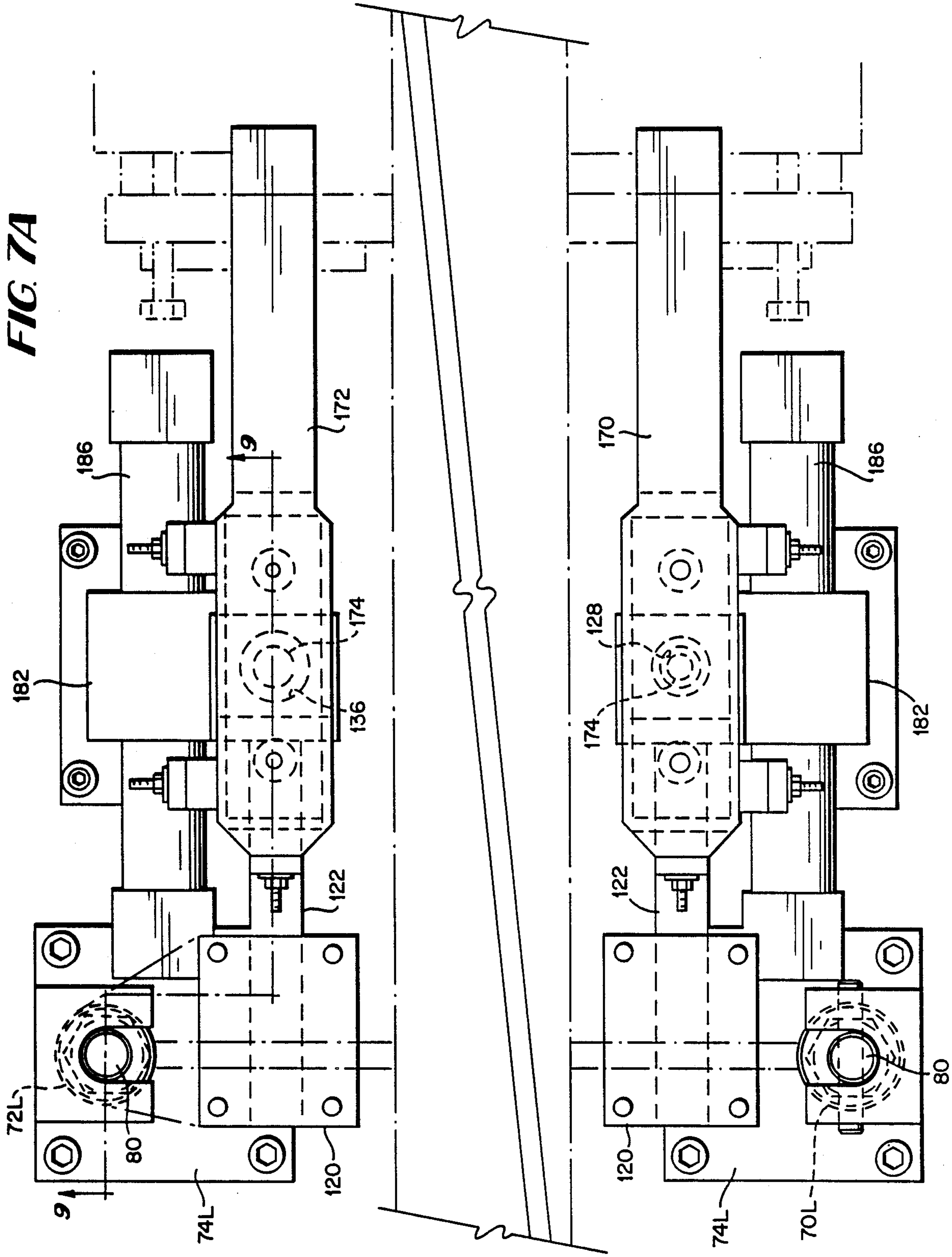
FIGS. 7A and 7B are plan views of the mountings illustrated in 6A and 6B, respectively, the illustration in FIG. 7A being of the front and back mountings at the left-hand end of the fluid jet printing device illustrated in FIG. 3.
Figure 7B:
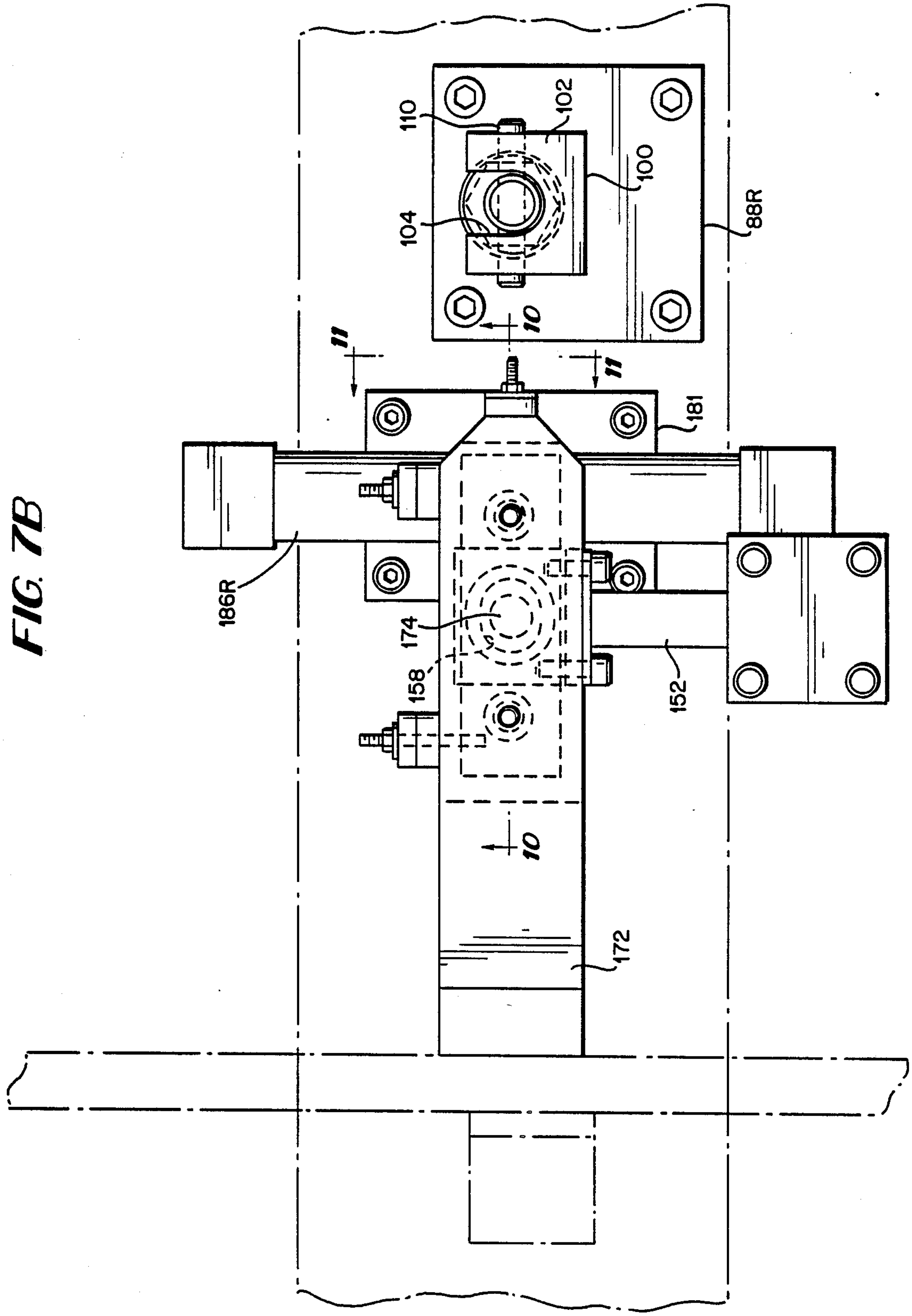
Figure 12:
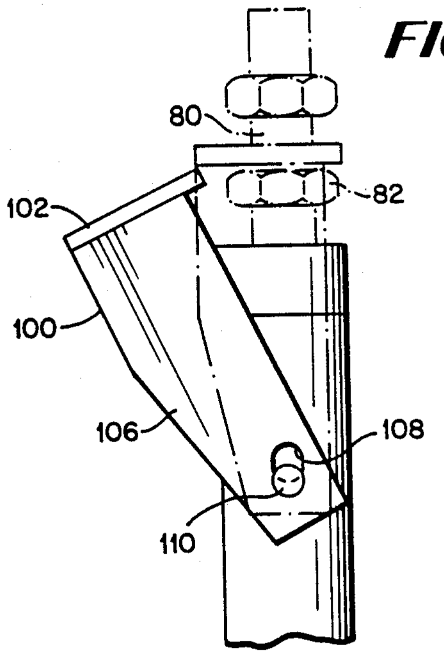
Figure 11:
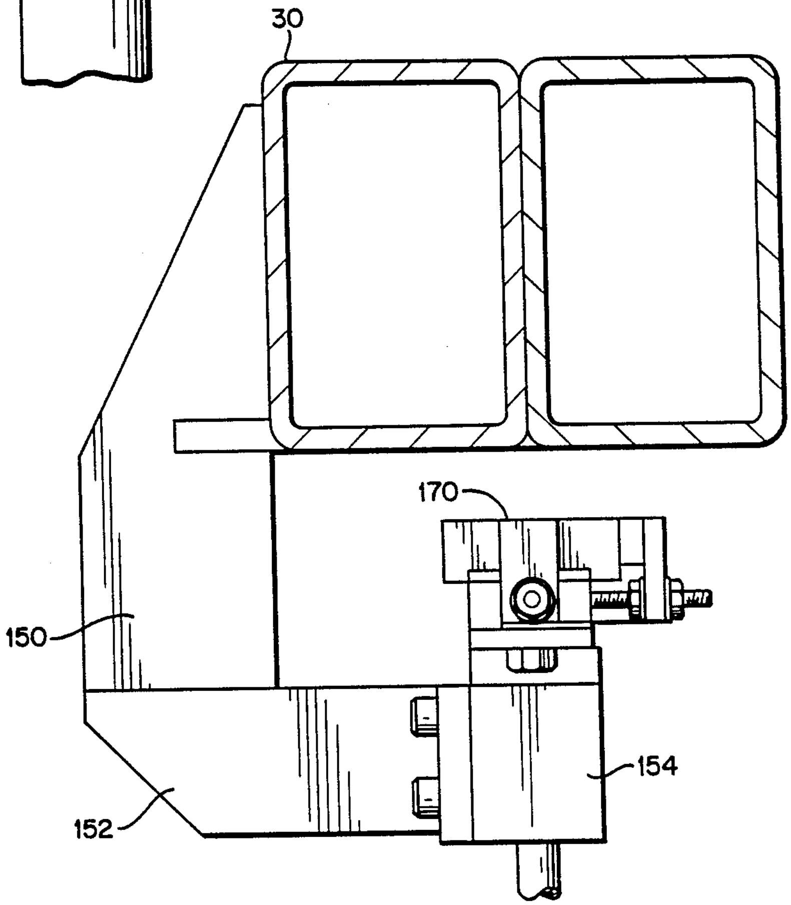
Figure 10:
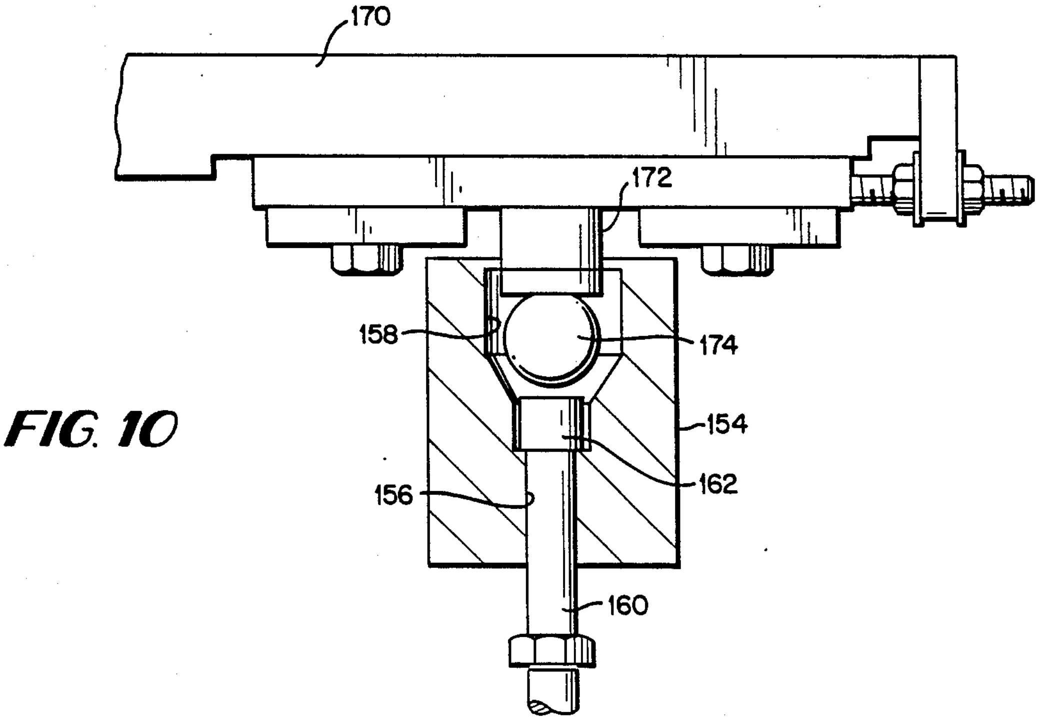

FIGS. 10 and 11 are enlarged fragmentary cross-sectional views taken generally about on line 10—10 and 11—11, respectively, in FIG. 7B;

FIG. 12 is a fragmentary end elevational view of a clamping mechanism for retaining the head on the base; and FIG. 13 is a schematic cross-sectional view of a fluid jet printing head being removed from the fluid jet printing line.

DETAILED DESCRIPTION OF THE DRAWING FIGURES

Reference will now be made in detail to the present preferred embodiment of the invention, an example of which is illustrated in the accompanying drawings.

Figure 1:
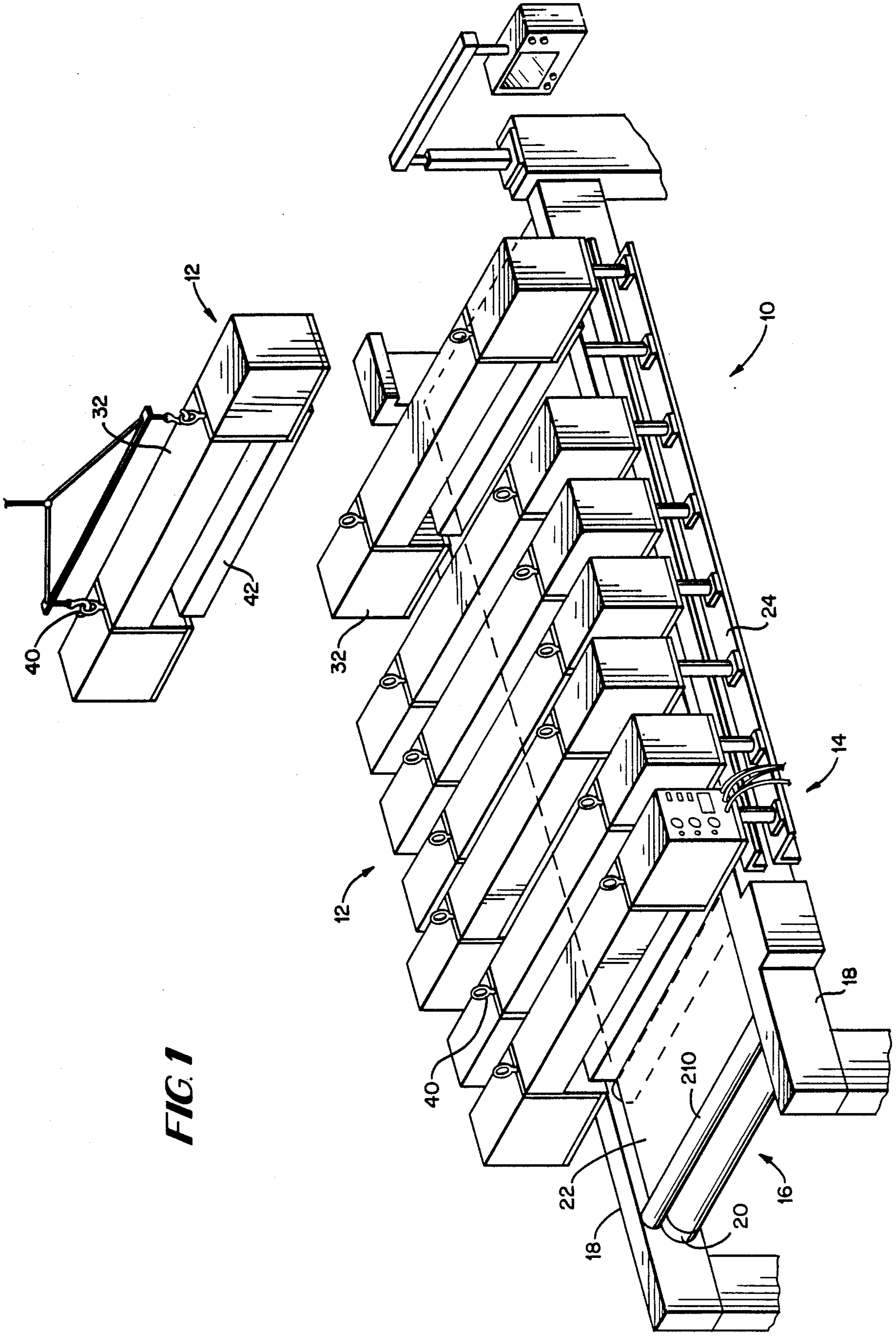
FIG. 1 is a fragmentary perspective view illustrating a fluid jet printing line for textile fabrics constructed in accordance with the present invention.

Referring now to FIG. 1, there is illustrated a fluid jet printing line, generally designated 10, comprised of a plurality of serially arranged fluid jet print heads, generally designated 12, disposed along a base, designated 14, including a transport 16 for transporting a substrate S, e.g., a textile fabric (FIG. 3), longitudinally along the line to pass below print heads 12. As illustrated in FIG. 1, base 14 includes a support structure, i.e., a pair of longitudinally extending support beams 18, spaced laterally one from the other a distance greater than the width of the textile fabric, not shown in this Figure, and thus greater than about 1.8 meters. Disposed between beams 18 is a plurality of longitudinally spaced rollers 20 over which are provided an endless belt 22 (FIG. 3A) by which fabric is transported longitudinally along the line below print heads 12. Disposed along the outer face of each beam 18 and extending longitudinally of the line is an elongated mounting plate 24 on which there is provided a plurality of longitudinally spaced, upstanding stanchions 26. Stanchions 26 support heads 12 in a manner to be described.

Figure 3:
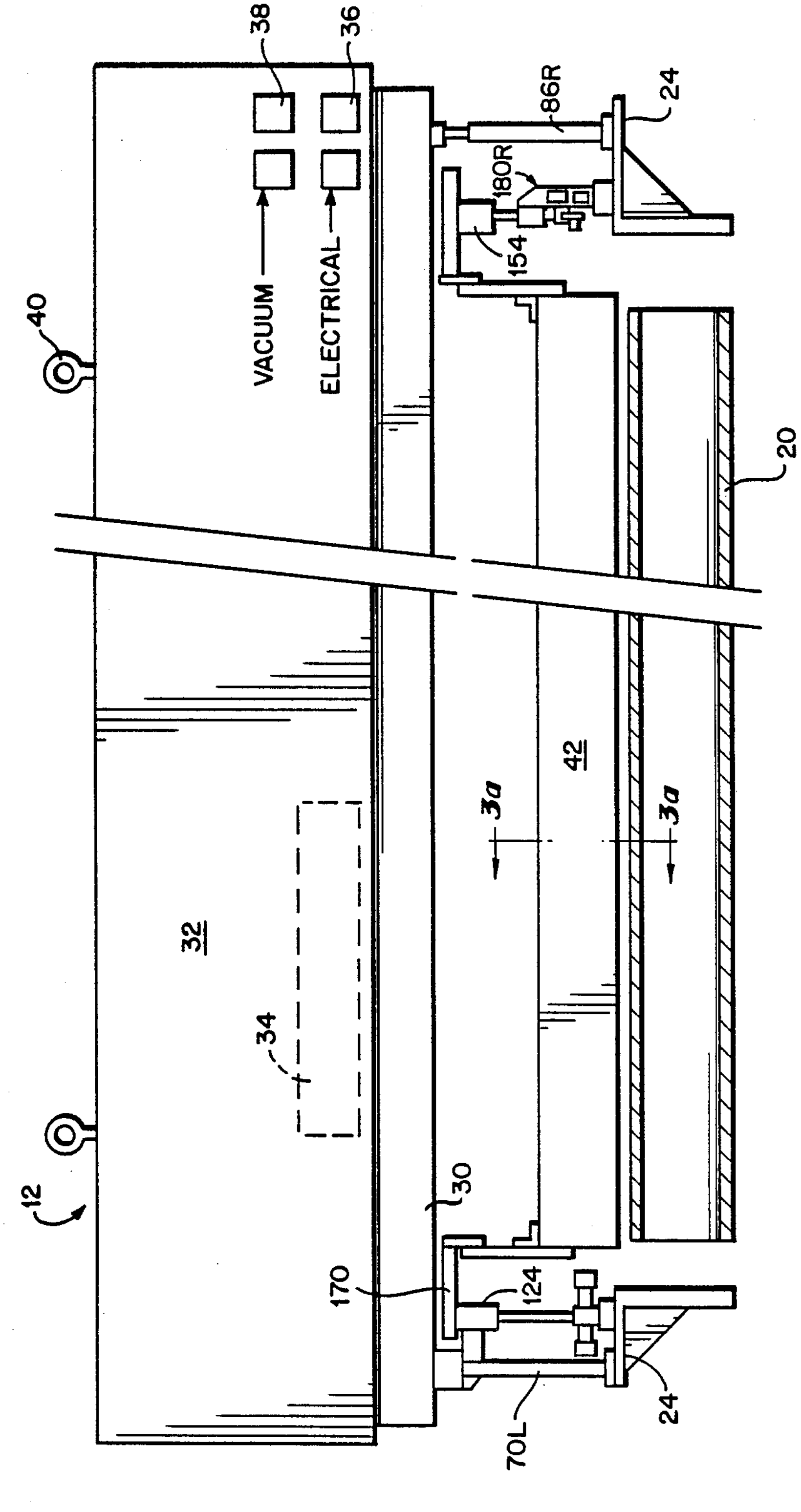
FIG. 3 is an enlarged front elevational view, with portions broken out for clarity, of a single fluid jet printing station in the printing line illustrating a fluid jet printing device mounted on a base in position for printing and with portions of the substrate transport illustrated in cross-section.

Referring to FIG. 3, each head 12 includes a support beam 30 and a housing 32 supported on top of beam 30. Housing 32 contains a portion of the electronics for controlling the voltage on the charge and deflection electrodes of the fluid jet printing device, to be described, as well as a self-contained fluid supply 34 such that the fluid distribution bar 42 of the fluid jet printing device may be run independently of a separate fluid supply when in transit between a make-ready station, not shown, and the production line as described hereinafter. Additionally, an air-conditioning unit, not shown, is provided in housing 32 to maintain the electronics at the appropriate temperature.

In accordance with the present invention, dual electrical and fluid pressure, e.g., vacuum, connections 36 and 38, respectively, are carried by head 12. As will be appreciated from the ensuing description, dual connections are necessary such that the print head may be disposed in the production line in a running condition. Each head 12 is also provided with upstanding eyelets 40 whereby the head may be lifted by a crane, generally designated C (FIG. 13).

Figure 3A:
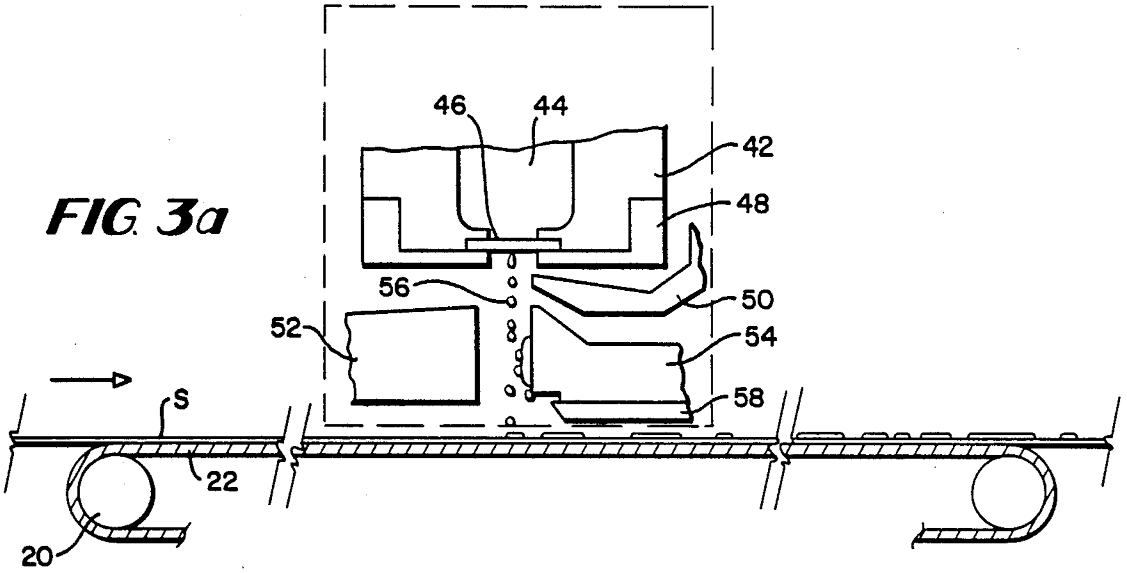
FIG. 3A is an enlarged cross-sectional view thereof taken generally about on line 3A-3A in FIG. 3.
Figure 3B:
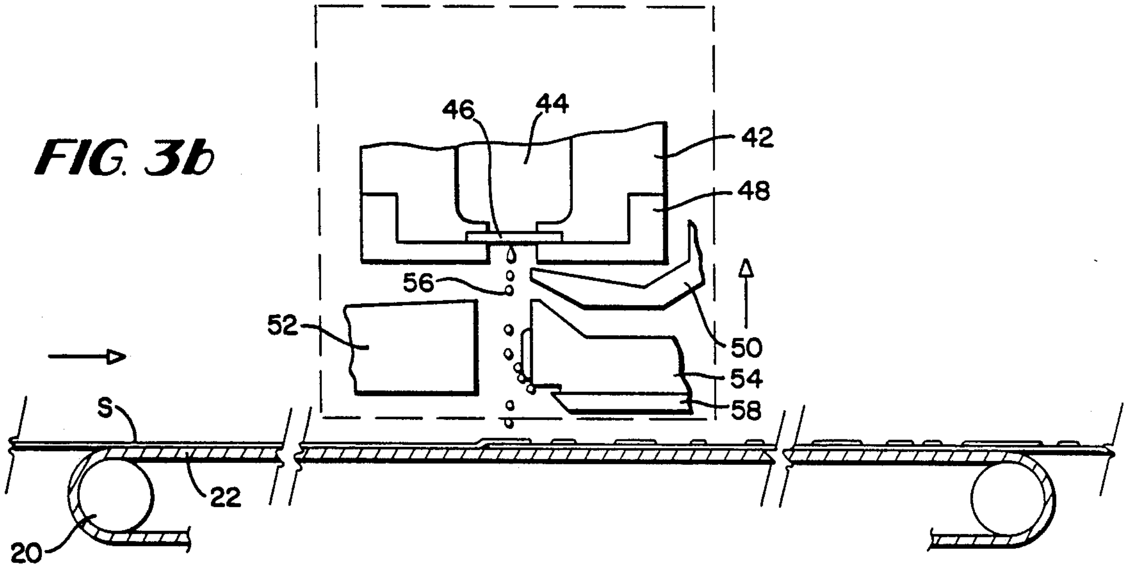
FIG. 3B is a view similar to FIG. 3A illustrating the fluid distribution bar and ancillary electrode and catcher structure in an elevated position relative to the substrate transport.

As best seen in FIGS. 3, 3A and 3B, head 12 supports, by means to be described, the fluid distribution bar 42. Fluid distribution bar 42 includes a plenum 44, the lower outlet of which is provided with an orifice plate 46 clamped to bar 42 by clamps 48, a charge electrode 50, a deflection electrode 52, and a catcher structure 54. As will be apparent to those skilled in fluid jet printing devices, orifice plate 46 contains a linear array of fluid jet orifices from which filaments of fluid from plenum 44 issue to form a plurality of droplet streams 56 for deposition on a substrate S, e.g., a textile fabric. Charging electrodes 50 are individually controllable and are disposed downstream of the orifice plate along the drop formation zone. As the fluid filaments form, they are provided an electrical charge opposite in polarity and related in magnitude to the electrical charge of the charging electrode 50. When the droplets separate from the filaments, the induced electrostatic charge is trapped on and in the droplets. Charged droplets pass through a subsequent electrostatic field generated by deflection electrode 52 and are thereby deflected from a straight downward path toward catcher structure 54. The lower portion of catcher structure 54 includes an ingestion blade 58 whereby deflected fluid droplets are caught and returned to the fluid supply system for recirculation and ultimate deposition on the substrate. Uncharged droplets proceed along the straight path and are deposited upon the receiving substrate S, i.e., the textile fabric.

As best illustrated in FIGS. 3 and 7, the fluid distribution bar 42, together with the ancillary structure thereof disposed within the dashed lines illustrated in FIGS. 3A and 3B and referred to collectively as the fluid distribution bar, are carried by head 12 for movement therewith, for example, when print head 12 is removed from the print station and transported to a clean room for service. Head 12 is removably mounted on base 14 by means of a three-point mounting, hereafter sometimes referred to as the head-base mounting. As schematically illustrated in FIG. 5, the three-point head-base mounting includes a pair of mountings at the left-hand end of print head 12 and a single mounting at the right-hand end. Further, distribution bar 42 is also mounted on a three-point mounting carried by head 12, hereafter sometimes referred to as the bar-head mounting, whereby distribution bar 42 and the ancillary structure carried thereby illustrated in FIG. 3A may be elevated as desired, relative to housing 32, transport 20 and base 14. For purposes of the present description, two mountings for the head-base three-point mounting and two mountings for the bar-head three-point mounting are located at the left-hand end of the print head, while the single remaining mounting of the three-point head-base mounting and the remaining single mounting of the three-point bar-head mounting, are located at the right-hand end of the print head, as illustrated in FIG. 3. It will be appreciated that these positions may be reversed and further that the use herein of the terms left-hand and right-hand is for purposes of convenience of description only. Additionally, corresponding elements of the structure, as applicable for ease of description and clarity, will carry the suffix L or R, indicating the location of the element on either the left or right-hand side of the structure, respectively.

Figure 6A:
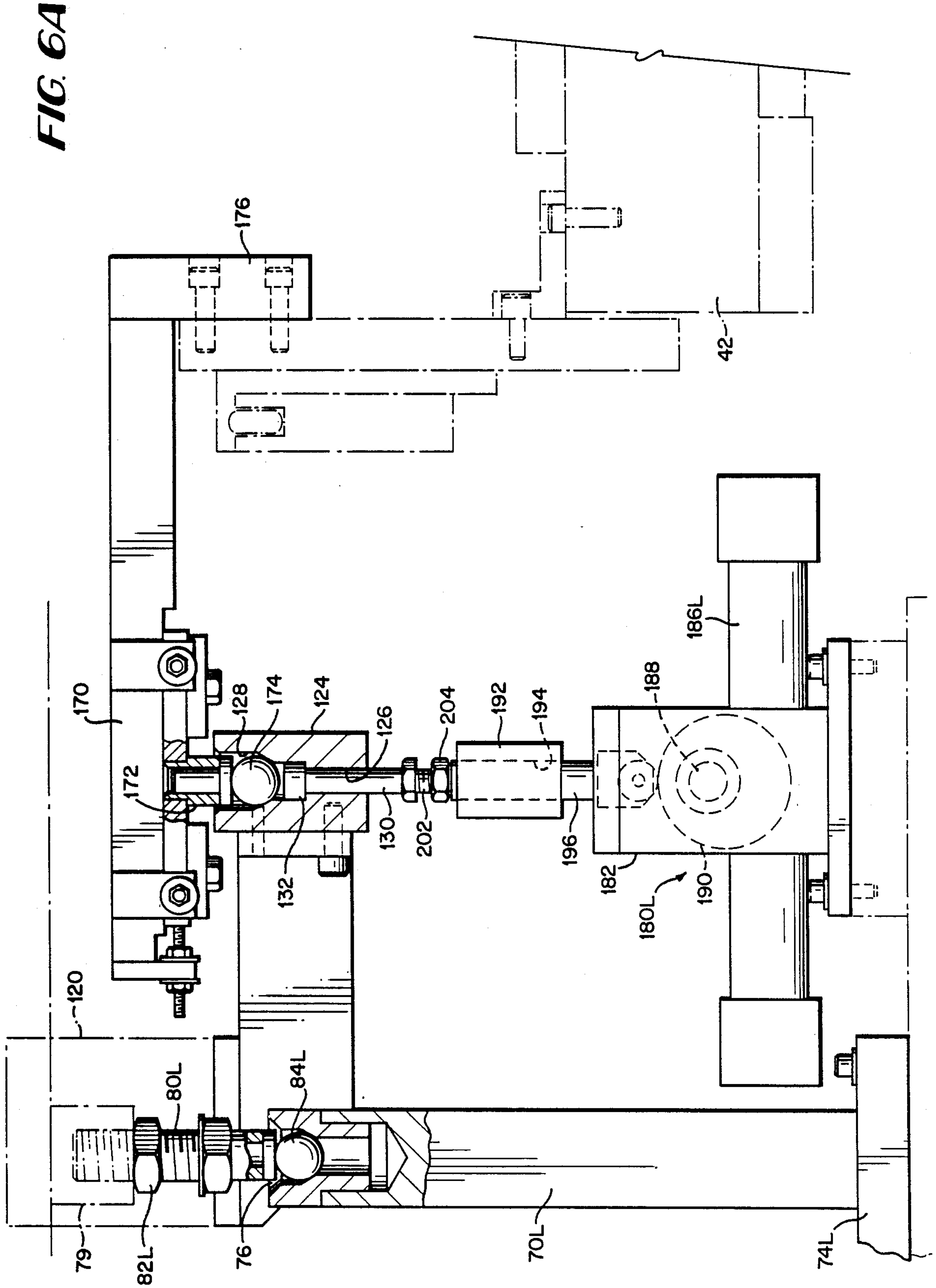
FIGS. 6A and 6B are enlarged front elevational views with parts broken out and in cross-section illustrating the mounting of the fluid distribution bar on the head and the mounting of the head including the fluid distribution bar on the base at respective left and right hand ends of the fluid jet printing device illustrated in FIG. 3.
Figure 8:
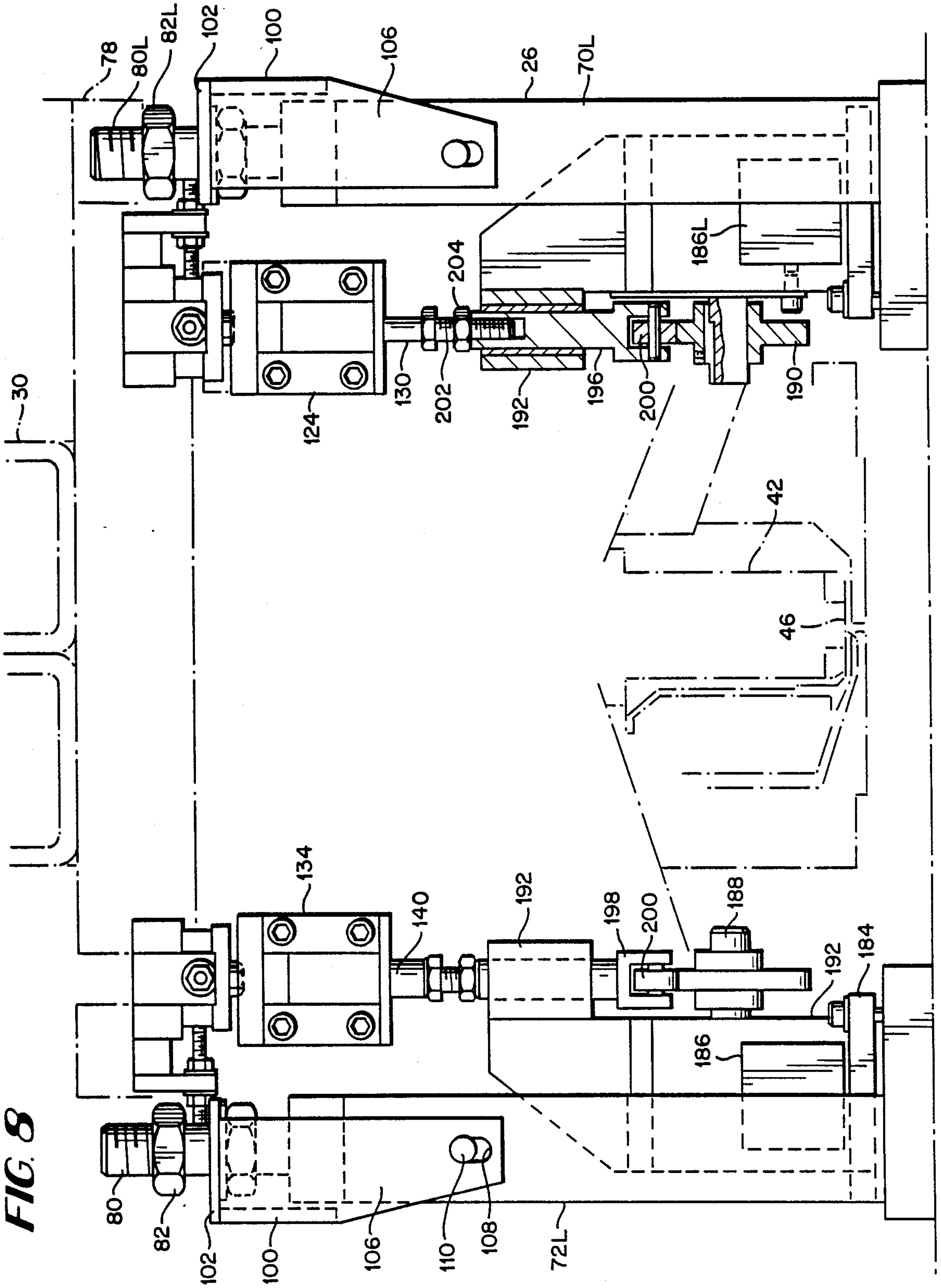
FIG. 8 is an end elevational view with parts broken out and in cross-section of the left-hand end of the printing device looking from left to right in FIG. 3.
Figure 9:
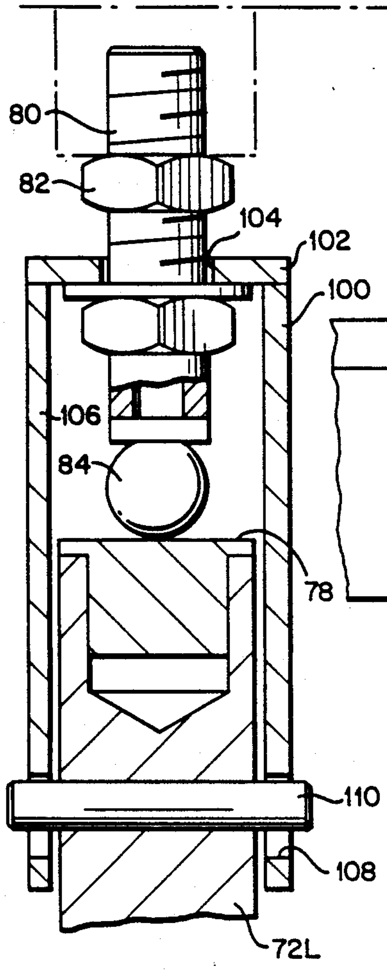
FIG. 9 is an enlarged fragmentary cross-sectional view taken generally about on line 9—9 in FIG. 7A.
Figure 9:
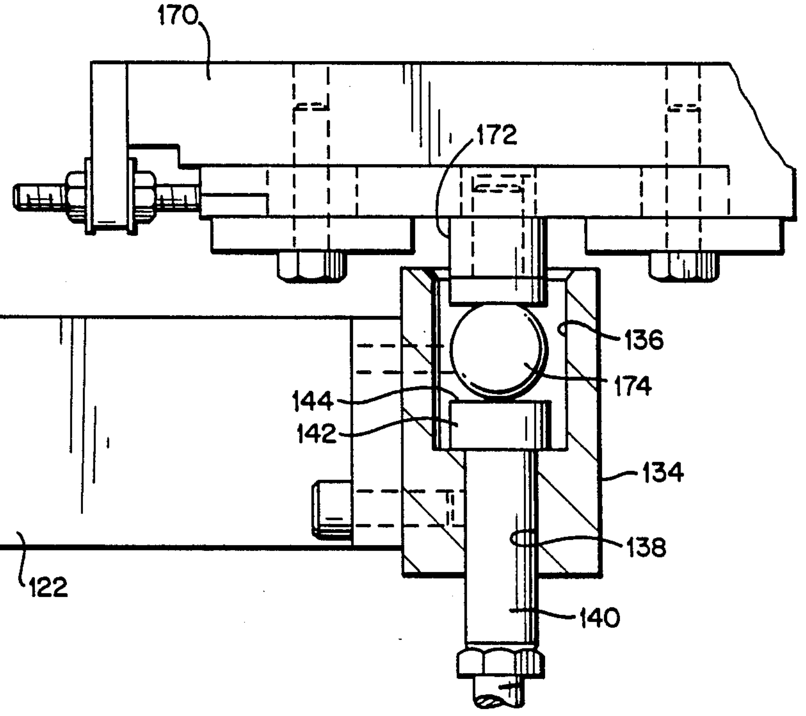

Referring now to FIGS. 6, 7 and 8, a pair of upright stanchions 70L and 72L are spaced longitudinally one from the other at each print head station along the left side of the line and are secured at their bases to a support plate 74L, in turn, secured to mounting plate 24. As best illustrated in FIG. 6A, stanchion 70L terminates at its upper end in a conical socket 76 while stanchion 72L has a closed upper end terminating in a flat 78 (FIG. 9). Secured to mounting blocks 79 disposed along the underside of support beam 30 adjacent its left-hand end are a pair of longitudinally spaced depending threaded bars 80L each with a pair of locknuts 82L. A ball 84L is fixed on the lower end of each bar 80L and, when print head 12 is supported by base 14, balls 84L at the left-hand end of the print head are disposed in conical socket 76 and on flat 78, respectively. The upper locknuts 82L or bars 80L enable axial adjustment of the balls 84L relative to support beam 30.

Figure 6B:
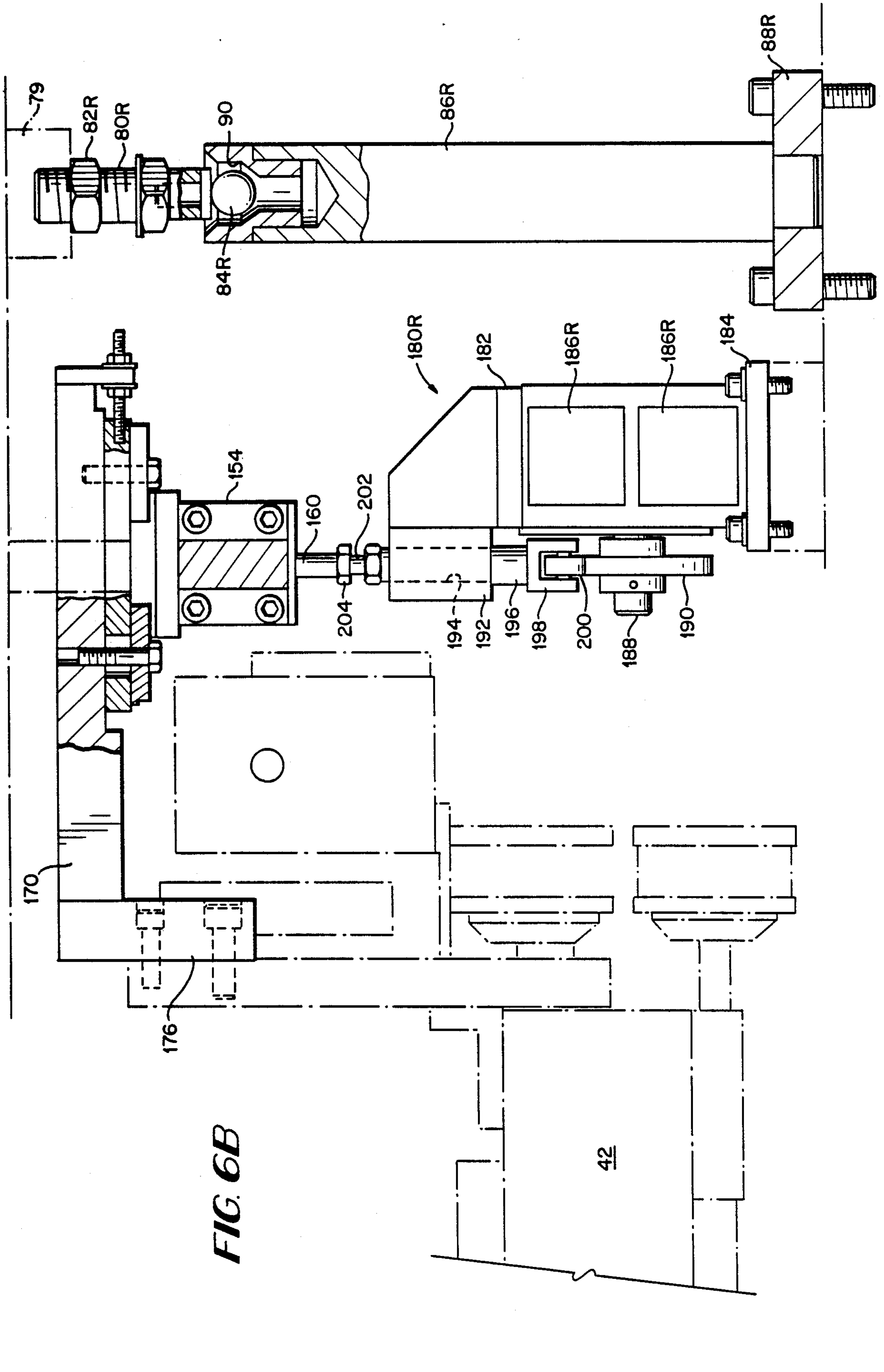

Turning now to FIG. 6B, a similar stanchion 86R is provided at each print head station and is supported on a support plate 88R, in turn, mounted on the right-hand mounting plate 24. The upper end of support stanchion 86R terminates in a grooved socket 90, the long axis of which extends in a direction transversely to the print head and print line. Similarly as on the left-hand side, a threaded bar 80R depends from a mounting block 79 secured to support beam 30 at the right-hand end of the print head and has a pair of locknuts 82R. The lower end of threaded bar 80R terminates in a ball 84R for reception in grooved socket 90.

By this arrangement, a three-point mounting is provided each print head between it and base 14, namely, the ball-and-conical-socket mounting and the ball and flat mounting located at the left-hand end of each print head and the ball-and-groove mounting at the right-hand end of each print head. Thus, the location of the head relative to the base is fixed by the ball-and-conical-socket mounting and the ball-and-groove mounting, enabling accurate and repeatable location of the head vis-a-vis the base and permitting it to expand or contract in a horizontal plane without stressing the parts thereof. It also enables the head to be readily removed from base 14 simply by lifting it from the base.

To ensure that each print head remains securely fastened to the base during use, each of stanchions 70L, 72L and 86R is provided with a bracket 100 (FIGS. 8 and 12) having an upper base plate 102 with a slot 104 for receiving the associated threaded bar 80. Bracket 100 also includes legs 106 depending from base plate 102. Legs 106 have elongated slots 108 at their lower ends, which receive the opposite ends of a pin 110 carried by the associated stanchion. The bracket 100 can be pivoted about pin 110 to engage bar 80 in slot 104 over the lower locknut 82, whereupon the lower locknut 82 can be threaded upwardly to lock the bar and hence head 12 to the stanchions. To release head 12 for movement from the print station as described hereinafter, each lower locknut 82 is backed off, enabling each bracket 100 to pivot out of the way, e.g., to the position illustrated in full line in FIG. 11, thereby releasing the associated bar, enabling removal of the head from the stanchions.

Referring now to FIGS. 6A, 7A and 8, the bar-head mounting will now be described. At the left end of the head, a pair of mounting blocks 120 depend from support beam 30 at longitudinally spaced positions therealong and each mount an inwardly extending bracket 122. The inner end of the forwardmost bracket 122 illustrated in FIG. 6A is secured to a support cup 124. As illustrated, cup 124 has a central bore 126 opening through its lower end and a conical socket 128 opening through its upper end, and forming a conical seat. A pin 130 is disposed in bore 126, terminating in an enlarged head 132 at its upper end disposed in a cylindrical continuation of socket 128 below its conical portion. The lower end of pin 130 terminates just below cup 124.

Referring to FIG. 9, the rearmost cup 134 carried by the rearmost bracket 122 at the left-hand side of head 12 has an enlarged cylindrical opening 136 at its upper end and a bore 138 opening through its lower end. A pin 140 extends through bore 138, terminating at its upper end in an enlarged head 142, having a flat upper surface 144.

Adjacent the opposite (right-hand) end of print head 12 and inwardly of the head-base support at that end is the third mounting point of the three-point mounting for the bar-head. More particularly and referring to FIG. 11, a bracket 150 depends from support beam 30 and has a rearwardly and horizontally extending leg 152 secured to a cup 154. Cup 154 (FIG. 10) has a central axial bore 156 and a socket 158 opening through its upper end. The socket 158 forms an elongated groove, the long axis of which extends toward the opposite side of print head 12. Disposed within bore 156 is a pin 160, terminating at its upper end in an enlarged head 162 in a lower cylindrical extension of socket 158 and at its lower end just below cup 154.

Referring back to FIGS. 6A and 7A, three elongated support members 170 are provided each with a depending boss 172 mounting a downwardly projecting ball 174. As best illustrated in FIGS. 6A and 6B, the elongated support members 170, two on the left-hand end and one on the right-hand end of the head, extend inwardly to terminate in depending support members 176. Support members 176 are secured to distribution bar 42 by a structure, the details of which are not necessary to a disclosure of this invention. The structure, however, is shown schematically by the dashed lines in these drawing figures. Suffice to say that each of the elongated support members 170 support distribution bar 42 on the three-point mounting provided by the connections between the balls 174 and the cups 124, 134 and 154. More particularly, ball 174 and socket 128 provide a pivotal mounting for the distribution bar 42 which serves as a reference point whereby the distribution bar and ancillary structure may be accurately located. Additionally, by virtue of the contact between ball 174 and flat 144 of cup 134 and the ball 174 and groove contact afforded by cup 154 (FIG. 10), distribution bar 42 may expand or contract in response to changing temperatures. Consequently, the distribution bar and ancillary structure may be accurately and repeatedly accurately located relative to the head and additionally expand or contract in a horizontal plane with the ball-and-socket connection providing the reference point in both cases.

It will be appreciated from the foregoing description that head 12, including distribution bar 42, is removably mounted relative to base 14. That is, by using crane C as illustrated in FIG. 13, the head and distribution bar can be removed from the three-point head-base mounting by lifting the head off the base. This withdraws the balls 84L and 84R from their support on the stanchions 70L, 72L and 86R. Because the left-hand cups 124 and 134, as well as the right-hand cup 154, are supported by head 12, particularly by support beam 30, the distribution bar including such three-point mounting therefor, may be lifted from base 14 with head 12.

It is also a feature of the present invention that the distribution bar can be elevated from its print position to accommodate the passage of thicker substrate, i.e., seams, and then lowered for return to its print position upon passage of a substrate of normal thickness. To accomplish this, and referring particularly to 6A, 7A and 8, there is provided each print station at the left-hand end thereof a pair of elevating mechanisms, generally designated 180L and at the right-hand end a single elevating mechanism 180R. Except for the number of air cylinders and orientation of the mechanisms, they are otherwise identical. Thus, each elevating mechanism includes a housing 182 mounted on a support plate 184, in turn mounted on the mounting plate 24. Housing 182 of mechanism 180L carries an air cylinder 186L which, upon extension or retraction thereof, drives a shaft 188. Housing 182 of mechanism 180R carries a pair of air cylinders 186R which, upon extension or retraction thereof, drive a shaft 188. Each shaft 188 mounts an eccentric cam 190. Each housing 182 also carries a bracket 192, having a central bore 194 for receiving a shaft 196. The lower end of shaft 196 carries a clevis 198 mounting a cam follower 200 for bearing engagement against eccentric cam 190. The upper end of shaft 196 includes a threaded end 202 and a pair of nuts 204 whereby the end 202 may be axially raised or lowered relative to the housing 182. The upper end of shafts 196 register with and bear against the underside of a corresponding pin, i.e., pin 130 disposed at the front left side of head 12, the pin 140 at the rear left side of head 12 or pin 160 at the right side of head 12. Consequently, as eccentric cams 190 rotate when actuated by air cylinders 186L and 18R, cam followers 200 cause shafts 196 to be displaced axially upwardly to displace pins 130, 140 and 160. Upward displacement of these pins thus lifts balls 174 from cups 124, 134 and 154, thereby elevating distribution bar 42 relative to head 12 and the substrate transport.

Figure 2:
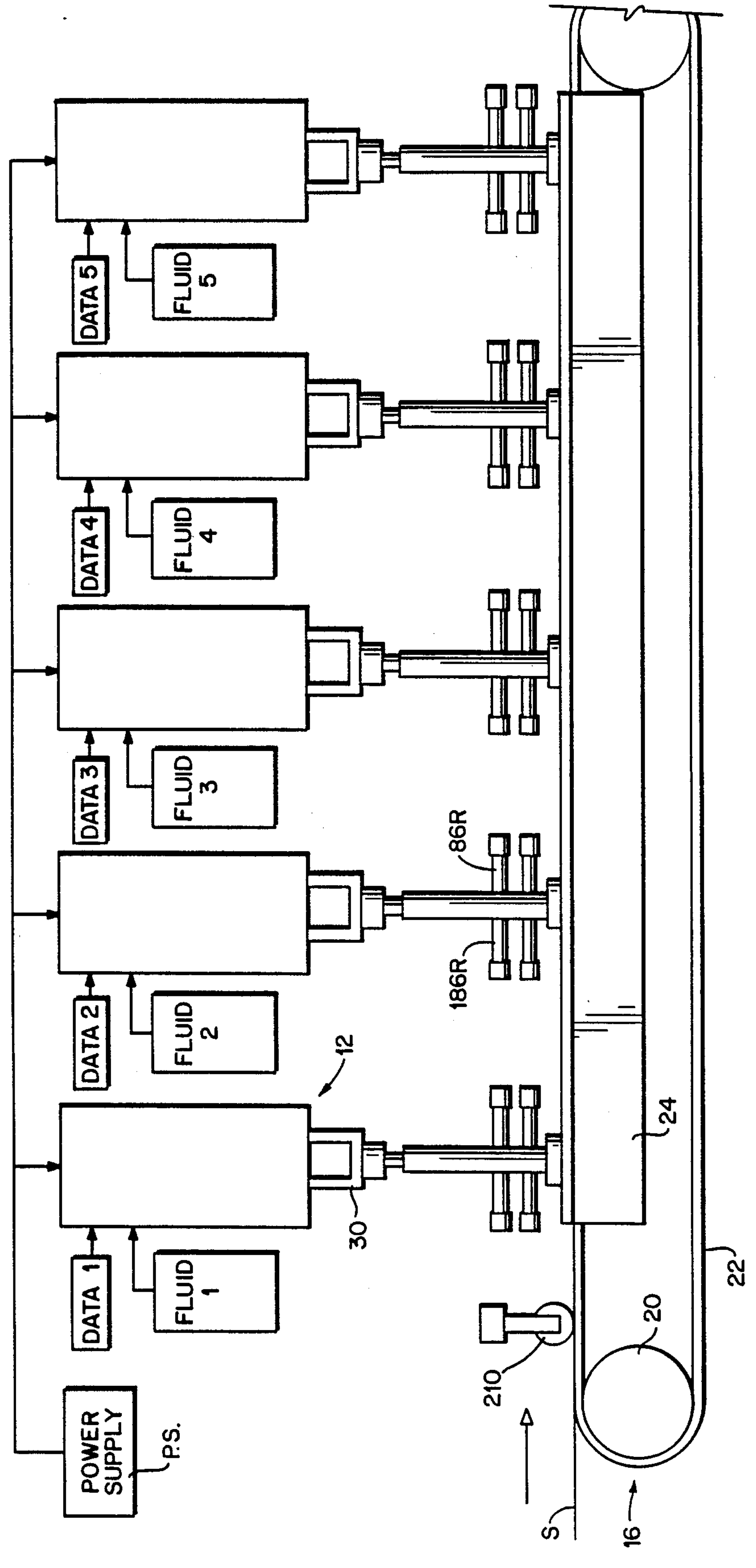
FIG. 2 is an enlarged, schematic, side elevational view of the printing line illustrated in FIG. 1.

Referring now to FIG. 2, there is provided a sensor 210 disposed above transport 16 and engageable with substrate S as the latter moves into printing position below the first print head 12. When a seam encounters the sensor, the additional thickness of the seam is sensed and sensor 210 provides a signal to actuate the air cylinders of the print heads sequentially as the seam passes the corresponding print heads. This signal may be an electrical or a fluid signal, as desired.

Figure 4:
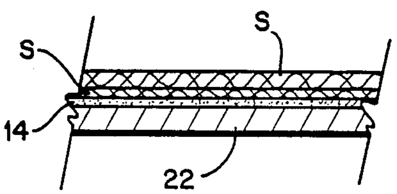
FIG. 4 is an enlarged fragmentary cross-sectional view of the transport with a fabric thereon illustrating the seam between the fabrics of adjacent rolls.

In FIG. 4, transport 16 comprises the endless belt 22 with the fabric or substrate S disposed thereon overlying an intervening layer of adhesive 214. The adhesive is used to maintain the fabric down on the transport belt. The fabric is illustrated at a seam where one layer of substrate S overlaps another layer of substrate S.

Referring now to FIGS. 2, 3A and 3B, the print heads are aligned one behind the other for printing on the substrate S as it registers below the distribution bars 42 thereof. Power is supplied from a power supply PS and electrical control signals are input to each of the print heads, as represented by the data 1, data 2, etc. blocks illustrated in FIG. 2. Each print head is also connected to a reservoir, not shown, of the ink, chemical or other fluid which will be applied at that particular print station. The reservoirs are independent of the print heads. Thus, with all print heads in a running full print mode depositing fluid onto substrate S, it will be appreciated that multi-colors or patterns, or both, as well as other applications, may be applied to the substrate, depending upon the pattern generated by the electrodes at each print station. As those knowledgeable in the fluid jet printing art will recognize, the droplets from the orifice plate 46 of each distribution bar are either charged or uncharged. The charged droplets are deflected by the deflection electrode 52 onto catcher 54, whereas the uncharged droplets continue in a straight downward path for deposition on substrate S.

In the event that a seam is detected by the sensor 210, the sensor provides a signal to the air cylinders and the latter are actuated in a timed sequence to lift the distribution bars in a manner previously described a predetermined distance from transport belt 22. In this manner, the doubled thickness of the seam is accommodated between the transport belt 22 and the underside of catcher 54. The relative distance between the orifice plate and the seam, however, preferably remains substantially the same in the elevated position of the distribution bar, as between the substrate and the underside of the catcher under normal operating conditions. When the seam passes each distribution bar, the air cylinders are reversed to rotate the cams to enable the distribution bar to move downwardly into its normal print position.

In the event of a malfunction of one or more of the print heads, it is a particular feature of the present invention that the malfunctioning print head may be removed from the fluid jet printing line and readily and quickly replaced by a new fluid jet printing head. The changeover may be effected in a relatively short period of time with minimum downtime of the production line. Thus, when a malfunction occurs, the fluid jet print line is shut down by converting all print heads into the "full-catch" mode. The fluid distribution bar of the malfunctioning print head is emptied of ink or fluid to the extent possible while in the production line. The fluid and electrical connections to the print line are then disconnected. Crane C then lifts the head, including the distribution bar, from its position on the base. The malfunctioning print head is then returned to a clean room in a shutdown state for servicing.

When a print head is first observed to be malfunctioning in the production line, a replacement print head in the clean room is started up on a test stand. The test stand is provided with a support fluid system for running through the replacement print head a flush fluid having characteristics of the fluid to be dispensed in use. The print head is started up with the flush fluid using the moveable catcher tray, not shown, and other ancillary equipment including a test transport device, not shown, such that the image deposited by the flush fluid on the transport device can be viewed. That is the print head is brought up to a full print mode and completely checked out as to print quality and correct functioning. All manipulations to achieve jet straightness and integrity and all electrode and catcher adjustments are performed on the replacement print head in the clean room such that the replacement print head is in a "ready to print" condition prior to moving it from the clean room to the printing line.

When the replacement print head is operating correctly, it is placed in a "full-catch" operating mode for transport to the printing line and insertion in place of the malfunctioning print head. Crane C is provided with a recirculating fluid system and a self-contained electrical power supply transportable with the crane to enable the print head to be transported from the clean room to the printing line while the print head is running in its "full-catch" mode. Dual power and fluid connections 36 and 38, respectively, are provided the print head such that fluid and electrical connections with the fluid and electrical systems, respectively, of the crane can be made prior to disconnecting the fluid and electrical connections used in the clean room. The crane then transports the replacement print head in a "full-catch" running mode into the print line. The crane disposes the print head on its three-point mounting, i.e., on the stanchions upstanding from base 14. This accurately locates the print head in the line. The print line fluid and electrical connections are then made prior to disconnecting the fluid and electrical connections between the print head and the crane. Once made, the print fluid supplied by the print line is mixed with the flush fluid in the replacement head and the diluted print line fluid is diverted to waste until the flush fluid is substantially eliminated from the distribution bar. Once the print line fluid and electrical connections are made, the fluid and electrical connections from the crane are disconnected from the print head. The print heads of the print line are then converted from their "full-catch" running mode to their print condition and the substrate transport is started, whereupon the fluid jet print line resumes printing operations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Fluid jet printing apparatus for printing on a substrate comprising:

a fluid jet printing head for disposition above a substrate;

a print bar carried by said head including an orifice plate for flowing fluid through the orifices of said plate for deposition on the substrate; and means carried by said head mounting said print bar for linear movement relative to said head in directions toward and away from said substrate.

2. Apparatus according to claim 1 wherein said mounting means includes a three-point mounting between said head and said print bar.

3. Apparatus according to claim 2 wherein said three-point mounting constitutes substantially the sole structural support for said print bar.

4. Apparatus according to claim 3 wherein said three-point mounting includes a pivotal mounting enabling pivotal movement of said print bar about a generally vertical axis, a mounting for precluding pivotal movement of said print bar relative to said head and enabling linear movement of said print bar in a single direction in a generally horizontal plane, and a mounting enabling movement of the print bar in any direction in a horizontal plane, respectively.

5. Apparatus according to claim 1 wherein said print bar includes electrodes for charging and deflecting charged droplets formed by filaments of fluid flowing from the orifice plate, a catcher structure for catching deflecting droplets, and electronic circuitry for charging said electrodes, said mounting means mounting the print bar for movement vertically in directions toward and away from said substrate, said print bar effecting deposition of fluid on the substrate by gravity flow of uncharged droplets formed by filaments flowing from the orifice plate.

6. Fluid jet printing apparatus for printing on a substrate comprising:

a base;

a fluid jet print head including a fluid distribution bar carrying an orifice plate, electrodes for charging and deflecting charged droplets formed by filaments of fluid flowing from said orifice plate, a catcher structure for catching deflected droplets, and electronic circuitry for charging said electrodes, said print bar effecting deposition of fluid on the substrate by gravity flow of uncharged droplets formed by filaments flowing from the orifice plate;

a transport for carrying the substrate past said orifice plate to receive uncharged droplets from said orifice plate; and means carried by said base for releasably mounting said head for movement between an operative printing position with said orifice plate in opposition to the substrate carried by said transport and a position removed from said base and enabling removal of said print head in linear vertical direction without inclination of said print head.

7. Apparatus according to claim 6 including means in part carried by said head for operating said printing head in a full-catch mode when removed from said base.

8. Apparatus according to claim 7 including means for removing said head from said base and replacing said head in operative position relative to said base, said operating means at least in part being carried by said removing means.

9. Apparatus according to claim 8 wherein said operating means includes power connections carried by said head and said removing means, and means for releasably connecting said power connections one to the other.

10. Apparatus according to claim 6 wherein said mounting means includes a three point mounting between said head and said base.

11. Apparatus according to claim 10 wherein said three-point mounting constitutes substantially the sole structural support for said bar.

12. Apparatus according to claim 11 wherein said three point mounting means includes, when said head is mounted on said base, a pivotal mounting enabling pivotal movement of said head about a generally vertical axis, a mounting for precluding pivotal movement of s aid head relative to said base and enabling linear movement in single direction in a generally horizontal plane, and a mounting enabling movement in any direction in a horizontal plane, respectively.

13. Fluid jet printing apparatus for printing on a substrate comprising:

a base for carrying the substrate;

a fluid jet print head carried by said base, said printing head carrying a print bar including an orifice plate in opposition to the substrate carried by said base, a fluid distribution bar for flowing fluid through the orifices of said orifice plate, electrodes for charging and deflecting charged droplets formed by filaments of fluid flowing from said orifice plate, a catcher structure for catching deflected droplets, and electronic circuitry for charging said electrodes, said print bar effecting deposition of fluid on the substrate by gravity flow of uncharged droplets formed by filaments flowing from the orifice plate; and means for raising said print bar relative to said base in a linear direction toward and away from said base.

14. Apparatus according to claim 13 wherein said raising means is at least in part carried by said base.

15. Apparatus according to claim 13 including means for detecting the presence of a variation in the thickness of the substrate and providing a signal in response thereto, said raising means being responsive to said signal for raising said print bar as the thickened substrate passes in opposition thereto.

16. Apparatus according to claim 13 including means carried by said head for supporting the print bar such that the orifice plate is disposed at a predetermined elevation, said raising means at least in part being carried by said base for raising said print bar relative to said print bar supporting means such that said orifice plate is disposed above said predetermined elevation.

17. Apparatus according to claim 16 wherein said print bar support means includes, when said print bar is mounted on said print bar support means, a pivotal mounting enabling pivotal movement of said print bar about a generally vertical axis, a mounting precluding pivotal movement of said print bar and enabling only linear movement in a single direction in a generally horizontal plane, and a mounting enabling movement in any direction in a horizontal plane, respectively.

18. In a fluid jet printing line having a plurality of fluid jet printing devices arranged serially for printing sequentially on a substrate passing along the printing line, a method of disposing a fluid jet printing device in the line comprising the steps of:

transporting the fluid jet printing device to the line for disposition in the line;

operating the fluid jet printing device during transport to the line in a full-catch mode; and once disposed in the line, changing the fluid jet printing device from said full-catch mode to a full print mode.

19. A method according to claim 18 including operating each fluid jet printing device in the line in a full-catch mode during transport and disposition of the fluid jet printing device in the line, and, upon disposition of the fluid jet printing device in the line, changing the operation of the fluid jet printing devices in the line from their full-catch mode to their full print mode.

20. A method according to claim 19 including the steps of transporting the fluid jet printing device in its full-catch mode by a movable transport, powering the fluid jet printing device from a power supply carried by the movable transport to maintain operation thereof in a full-catch mode during transport, connecting the fluid jet printing device with a separate power supply associated with powering the fluid jet printing devices in the line prior to disconnecting the fluid jet printing device from the power supply carried by the movable transport, and disconnecting the power supply between the fluid jet printing device when disposed in the line and the movable transport.

21. A method of operating a fluid jet printing line having a plurality of fluid jet printing devices arranged serially for printing sequentially on a substrate passing along the printing line, comprising the steps of:

removing one of the fluid jet printing devices from the line;

replacing the removed fluid jet printing device in the printing line with a replacement fluid jet printing device; and operating the replacement fluid jet printing device in a full-catch mode as the latter device is being placed in the fluid jet printing line.

22. A method according to claim 21 including the further step of changing the operation of the replacement fluid jet printing device from its full-catch mode to a full print mode when in place in the fluid jet printing line.

23. A method according to claim 21 wherein the step of operating the replacement fluid jet printing device includes running the latter device prior to placement in the line in a full print mode to ensure the accuracy of the printing function, subsequently operating the replacement fluid jet printing device in a full-catch mode during placement in the fluid jet printing line, and subsequently operating the replaced fluid jet printing device in its full print mode when placed in the fluid jet printing line.

24. A method according to claim 22 including the steps of transporting the replacement fluid jet printing device when in the full-catch operating mode into the fluid jet printing line by a movable means, powering the replacement fluid jet printing device during transport thereof by said movable means from an electrical power supply carried by said movable means to maintain operation thereof in a full-catch mode during transport, connecting the replacement fluid jet printing device with a separate source of power associated with powering the fluid jet printing devices in the line prior to disconnecting the replacement device from the power supply carried by said movable means, and disconnecting the power supply between the replacement fluid jet printing device and the movable means.

* * * * *